United States Patent
Vosteen

[19]

[11] 3,803,470

[45] Apr. 9, 1974

[54] SPEED SERVO FOR A PERMANENT MAGNET DIRECT CURRENT MOTOR

[76] Inventor: Robert E. Vosteen, 315 W. Center St., Medina, N.Y. 14103

[22] Filed: Jan. 18, 1972

[21] Appl. No.: 218,725

[52] U.S. Cl. ............................. 318/331, 318/341
[51] Int. Cl. .............................................. H02p 5/16
[58] Field of Search ................... 318/331, 341, 345

[56] References Cited
UNITED STATES PATENTS

| | | | |
|---|---|---|---|
| 3,474,259 | 10/1969 | Rodgers | 307/238 |
| 3,536,972 | 10/1970 | Lytz | 318/331 |
| 3,436,636 | 4/1969 | James | 318/331 |
| 3,504,260 | 3/1970 | Staples | 318/331 |
| 3,588,654 | 6/1971 | Balazs | 318/331 |
| 3,621,355 | 11/1971 | Dinger | 318/345 |
| 3,624,474 | 11/1971 | Nolf | 318/331 |

*Primary Examiner*—Bernard A. Gilheany
*Assistant Examiner*—Thomas Langer
*Attorney, Agent, or Firm*—Albert J. Santorelli

[57] ABSTRACT

A speed servo for a permanent magnet direct current motor having an armature comprising a DC power source and first switch means actuable to connect and disconnect the DC power source to the motor armature to determine the duty cycle thereof during which the DC power source is connected to the motor armature. Integrator means, and summing means receiving as inputs the motor counter EMF representative of actual motor speed and a variable DC reference voltage representative of the desired motor speed are also provided. Second switch means are actuable when the motor armature is disconnected from the DC power source by the first switch means to connect the summing means to the input of the integrator means. Further, duty cycle modulator means operate to control the first switch means and are connected to receive the output of the integrator means. If during the interval that the motor armature is disconnected from the DC power source an error signal represented by a difference between the applied input voltages to the summing means exists, the integrator means is operative to produce a correction output signal to cause the duty cycle modulator to vary the duty cycle to effect the desired motor speed.

11 Claims, 2 Drawing Figures

SPEED SERVO FOR A PERMANENT MAGNET DIRECT CURRENT MOTOR

BACKGROUND OF THE INVENTION

1. Field of the Invention

The invention relates to a speed servo providing regulation over a relatively large range of speed, and has particular utility for use in conjunction with permanent magnet direct current motors.

2. Description of the Prior Art

The use of speed servos to provide speed regulation of a motor is known in the art. Normally, good speed servos utilize some form of tachometer feedback which requires the connection of a tachometer to the shaft of the motor being speed regulated. This is inherently disadvantageous because the tachometer significantly increases the cost of the speed regulating unit.

SUMMARY OF THE DISCLOSURE

This and other disadvantages of the prior art are solved by the instant invention which operates under the principle that a permanent magnet direct current motor (PMDC), when rotating in the absence of armature current, has a DC counter EMF whose average value is directly proportional to its speed. Consequently, if this counter EMF can be utilized, there is no necessity to use a separate tachometer in speed regulation of the motor. The elements comprising the circuit are briefly described hereafter:

Solid State Switch

The use of high current, low saturation voltage switching transistors and thyristors in the described switching regulator is particularly advantageous. This combination results in excellent efficiency as solid state switching devices dissipate low power in the "on" state and negligible power in the "off" state.

Duty Cycle Modulator

Numerous switching circuits are known in the art having output duty cycles proportional to an input DC signal. This output can be used to drive the solid state switching device discussed above.

Gated Integrator

The motor counter EMF may then be compared with a DC command signal at that time when the armature current is zero. Any difference therebetween can be connected to feed a DC integrating amplifier whose output can control the above-discussed duty cycle modulator.

Counter EMF Sampling

It is necessary to permit the armature current to decay to zero before sampling the motor counter EMF because otherwise the ($iR + di/dt$) drop in the armature will introduce a serious error in the counter EMF measurement. When the motor's solid state switch is switched to the "off condition," the armature circuit, which of course is inductive, is interrupted and unless precautions are taken it can be destroyed because of an excessive $Ldi/dt$ drop across the armature. It is desirable to decrease this current as rapidly as possible and therefore the $Ldi/dt$ should be allowed to rise to only as high a voltage as is safe. This can be provided by placing a zener diode across the armature, having a zener breakdown voltage less than the destructive voltage for the corresponding switching transistor. As this voltage limits the rate of decay of armature current, a switching transistor having high collector voltage rating is generally desirable.

After the current has been switched off and the armature current has decayed, the armature can be connected to the integrator input through a suitable solid state switch such as MOSFET switch. Then a current proportional to the difference between speed command voltage and the motor counter EMF feeds the integrator input and corrects as necessary the duty cycle modulator input to produce the desired output motor speed. During excitation of the amrature, the integrator holds its output command to the duty cycle modulator, correcting only between pulses of armature current as described above.

Transient Response

Inasmuch as the duty cycle varies with the load on the motor, the controller gain, and thus the speed of response will be a function of armature load. The "on" duty cycle of the switch typically varies between 5 percent and 50 percent, thus insuring a sampling duty cycle of approximately 95 percent to 50 percent, or less than a 2-to-1 variation in gain. With the system designed for static or average speed stability rather than for response to a "dynamic" speed command, this did not pose a serious limitation. Under circumstances where a periodic motor load exists having a period short compared to the system speed of response, the output speed will vary but will average the correct speed.

DETAILED DESCRIPTION OF THE INVENTION

Figure 1:
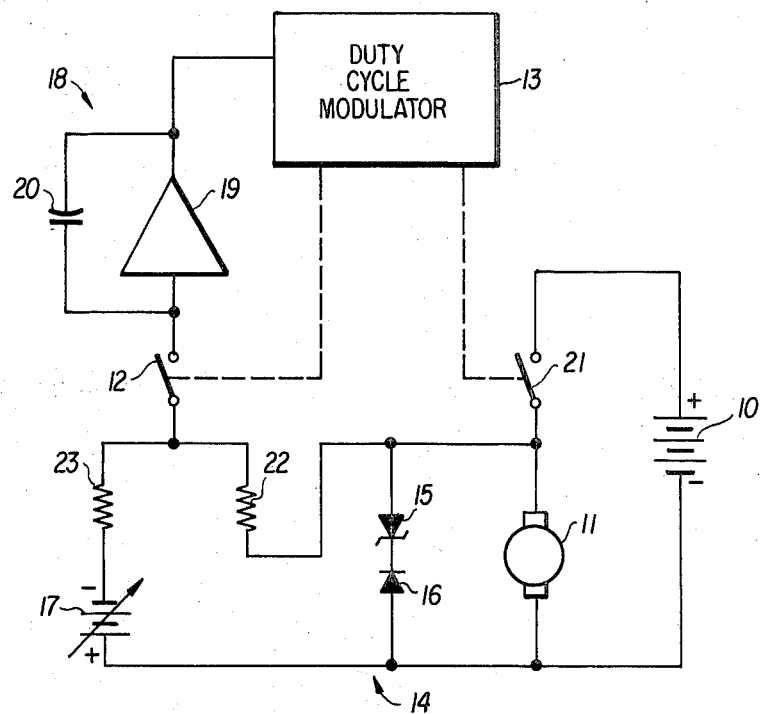
FIG. 1 is a block diagram of the system according to the invention.

FIG. 1 is a block diagram of a speed servo system wherein DC power source 10 feeds PMDC motor 11 through switch 21 controlled by duty cycle modulator 13. The absorption circuit 14 comprises the series connection of rectifier diode 16 and zener diode 15, in bucking configuration, and is connected in parallel across PMDC motor 11, to prevent forward conduction of zener diode 15 during normal operation and ensure reverse breakdown of zener diode 15 when absorbing the inductive surge of the deenergized armature. This optimizes armature magnetic energy discharge time. The series connection of resistors 22 and 23, and variable DC voltage uppply 17 across the anodes of diodes 15 and 16, with the series connection of resistors 22 and 23 being connected to switch 12 provides first and second inputs of opposite polarity to the summing junction of gated integrator 18 comprising amplifier 19 and feedback capacitor 20. The two inputs of opposite polarity feed the summing junction of gated integrator 18 are: (1) the PMDC motor counter EMF and (2) the speed command voltage which consists of variable DC voltage supply 17.

The summing junction is connected under the control of duty cycle modulator 13 to the series connection of resistors 22 and 23 through switch 12 only at such intervals that the armature is disconnected from DC power source 10 and the armature current has decayed to zero. During this interval, if an error exists between the speed command voltage and the fed-back voltage, a current will be applied into the integrator to correct the error. When switch 12 is opened under the control of duty cycle modulator 13, as during motor energization, the integrator will "hold" and its output will remain constant until its input is reconnected through switch 12 to the series connection of resistors 22 and 23 to effect further correction as required.

The integrator output feeds the duty cycle modulator 13 which functions such that an increase in its input current produces a higher duty cycle, that is, a greater percentage of "on" time, during which switch 21 is closed to feed current to the PMDC motor 11 from the DC power source 10.

Figure 2:
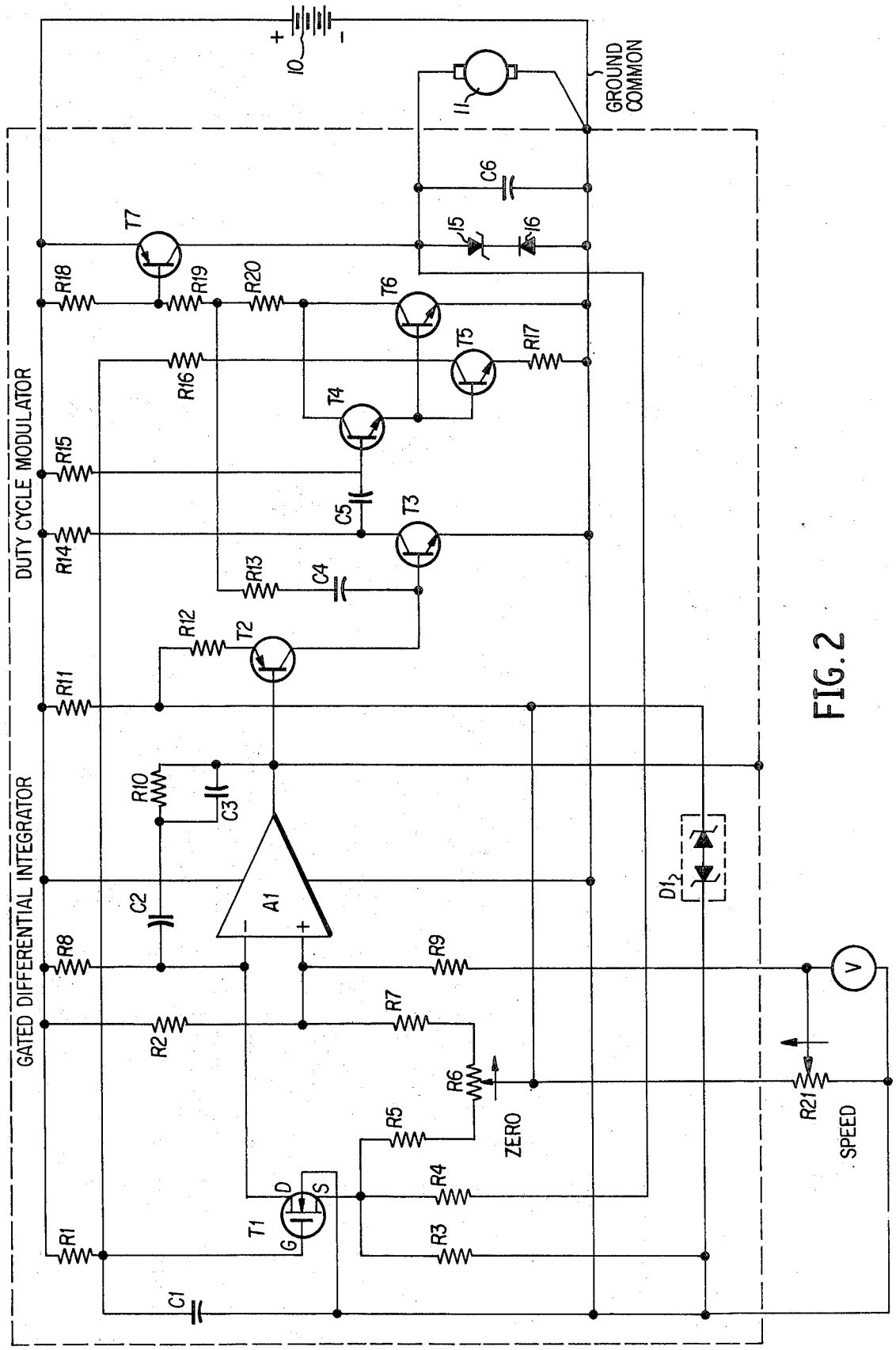
FIG. 2 is a detailed circuit diagram of the system according to the invention.

A detailed schematic diagram of the system according to the invention is shown in FIG. 2. Transistor T7 comprises a PNP transistor with its emitter being connected to the positive terminal of DC power source 10 and its collector being connected to one input of PMDC motor 11. Transistor T7 is connected to function as a solid state switch whose duty cycle controls the average current feeding the motor, equivalent to switch 21 of FIG. 1. Its operation will be described in detail hereafter. The series connection of zener diode 15 and rectifier diode 16 is connected, similarly as described with relation to FIG. 1, across the input terminals of PMDC motor 11. The described diode connection constitutes the zener absorption circuit which prevents overvoltage damage to transistor T7, while simultaneously rapidly discharging energy stored in the armature inductance of PMDC motor 11.

MOSFET transistor T1 having gate, drain, and source elements associated therewith, comprises a switch controlling the input to the differential integrator, similarly to the operation of switch 12 of FIG. 1. The differential integrator comprises differential operational amplifier A1 having integrating capacitor C2 connected in its feedback path. The parallel connection of resistor R10 and capacitor C3 in the feedback path and in series with feedback capacitor C2 provides optimization of the speed of response of the complete closed loop system by providing some proportional control therefor. The minus input to the operational amplifier A1 is connected from the positive side of the DC power source 10 through resistor R8. The described connection of resistor R8 is necessary to permit the system to start; otherwise, under some circumstances, the system will start at 100 percent duty cycle, will never sample, and will continue to operate at 100 percent duty cycle. Resistor R8 provides a current path to integrate out of the 100 percent duty cycle condition.

Resistor R2 is connected between the positive side of the DC power source 10 and the plus input to operational amplifier A1. Resistor R2 constitutes a compensating path for the "plus" input to the operational amplifier during normal operation, because resistor R8 is energized from the unregulated DC power source 10.

The circuit operates from a single DC power supply source 10, the vertical connections from the mid position of A1 constituting the required amplifier supply connections. The sampled feedback signal from the PMDC motor 11 can range from zero to almost full supply voltage, thereby exceeding the linear input capability of the operational amplifier. Resistors R3 and R4 are of equal resistance and are connected in series across the PMDC motor 11, with the junction of resistors R3 and R4 functioning as a feedback signal source having a resistance equal to one-half the resistance value of resistor R3 or R4, and a voltage capability of from zero to one-half the voltage of DC power source 10.

Zener device D1 comprising two back-to-back connected zener diodes is a voltage reference zener device deriving its input from the DC power source through resistor R11. As shown in FIG. 2, zener device D1 is connected to one input of resistor R11 with the other end of the zener device being connected to ground common, which is also the negative side of the DC power source 10. The series connection of resistor R11 and zener device D1 is connected to the variable tap associated with the resistor R6, and is at a voltage level approximately midway between the limits of power supply 10 feeding operational amplifier A1. It thus functions as the amplifier common.

The speed command potentiometer consists of resistor R21 and its associated arm, with resistor R21 being connected across reference supply zener diode device D1. The speed servo according to the invention is designed to operate at a speed directly proportional to the voltage existing between the arm of speed command potentiometer and system common. Consequently, a voltmeter V connected between these points will directly indicate motor speed as long as the speed control servo is operating in its linear range and is not overloaded.

The system zero potentiometer consists of resistor R6 and its associated arm. Resistors R9 and R7 are of equal resistance and are connected in series between the arm of the speed command potentiometer and the amplifier common, the high voltage side of zener diode device D1, through the connection of resistor R7 to the arm of the zero adjust potentiometer associated with resistor R6. Resistors R9 and R7 are of equal resistance and sufficiently larger in resistance than resistor R6 such that a reference varying voltage is produced at the plus input to operational amplifier A1 which varies between the reference voltage at the high voltage side of zener diode device D1, and approximately one-half that reference voltage. Resistors R7 and R9 further provide a source resistance equal to approximately one-half the resistance value of either of the equal resistors R7 and R9.

Resistor R3 is connected between the source of transistor T1 and the low voltage side of zener diode device D1. Resistor R4 is connected between the source of transistor T1 and the input to PMDC motor 11 to provide the feedback path. Resistors R3 and R4 are of equal resistance. Resistor R5 connected to the source of transistor T1 is also connected to the amplifier common through resistor R6 and its associated arm (the zero control) to provide a scaled feedback voltage which matches the reference voltage at the amplifier common, while maintaining the voltage range within the linear differential range of the operational amplifier.

The operational Amplifier A1 is connected as a standard differential integrator with two exceptions:

1. Transistor T1 is added and functions as a switch to sample only during times of zero armature current, and 2. No capacitive network between the "plus" input to the amplifier and system common is required because this voltage is normally constant, thus rendering the capacitor unnecessary.

The zero potentiometer consisting of resistor R6 and its associated arm, functions to compensate for imperfect tolerances in resistors R3 and R4, which are of equal resistance, and resistors R5, R7 and R9, which also are of equal resistance value but equal to one-half the resistance of R3 or R4. It is adjusted for an integrator output within the linear range under conditions of zero speed command. The regulator thus functions to drive the open circuit voltage difference between the command junction (the junction of resistors R7 and R9), and the feedback junction (the junctions of resistors R3, R4 and R5) to zero differential voltage.

The duty cycle modulator is a cross-coupled (collector-to-base) astable multivibrator consisting basically of NPN transistors T3 and T4, with the collector of transistor T3 being coupled to the base of transistor T4 through capacitor C5. Since the collector current of transistor T4 is insufficient to drive transistor T7, transistor T4 is Darlington connected to transistor T6 to provide the necessary base drive to transistor T7.

The feedback path to the base of transistor T3 is from the junction of resistors R19 and R20 to prevent exceeding of the reverse-emitter voltage rating of transistor T3. Resistor R13 is connected between the series connection of resistors R19 and R20 and the base of transistor T3 through capacitor C4. Resistor R13 prevents excessive base current in the base of transistor T3. A charging current for capacitor C4, during the "off" cycle of transistor T3, is derived from transistor T2, a PNP transistor operative as a current source controlled by the gated differential integrator output. The more negative the output of operational amplifier A1, the higher the collector current from transistor T2, whose base is connected to the output of operational amplifier A1, and therefore the shorter the "off" time of transistor T3 connected at its base to the collector of transistor T2.

The bases of NPN transistor T5 and T6 are connected to the emitter of transistor T4, therefore their bases are simultaneously forward biased by transistor T4. Resistor R17 connected between the emitter of transistor T5 and system common limits the base drive of transistor T5 as little collector current is required for its switching function. The collector resistor for transistor T5 is resistor R1. Capacitor C1 is connected between resistor R1 and system common. The junction of resistor R1 and capacitor C1 feeds the gate of transistor T1, the integrator input current gate. When transistor T5 conducts, capacitor C1 is very rapidly discharged, thereby switching transistor T1 off, essentially simultaneously with the energization of PMDC motor 11. However, when the motor current is switched off by transistor T7, transistor T1 turn-on is delayed by the time constant of resistor R1 and capacitor C1 a sufficient time to permit the decay of the armature current through diodes 15 and 16, the inductive surge absorber. This prevents an integrating error because of a residual voltage drop due to $(I_A R_A + L_A \, dT_A/dt)$.

Observation of the open circuit armature voltage indicates a noisy signal attributable to intermittant connection between brushes and commutator of the motor. Discontinuities in this signal feeding the differential integrator can produce significant errors in system performance as the feedback signal can intermittently very briefly drop to a value approaching zero. If a capacitor is placed across the motor armature such that the time constant of this capacitor multiplied by the resistive load of resistor R3 in series with resistor R4 and resistor R5 in parallel is large compared to the voltage drop-out duration, this error can be reduced to a small value without otherwise significantly influencing system performance. Hence, the connection of capacitor C6 as indicated between the input terminals of the motor.

Resistors R12, R14, R16 and R18 perform conventional biasing functions and consequently are not described in detail herein.

It should be recognized that other equivalent transistor and other circuits may be substituted for those shown in FIG. 2, and the invention is not to be interpreted as limited only to the circuit structure shown therein.

I claim:

1. A speed servo for a motor having an armature comprising:

a DC power source, first switch means operable to connect and disconnect the DC power source to the motor armature to set the duty cycle thereof during which the DC power source is connected to the motor armature, differential summing means having a first input selectively connectable to the armature to receive a signal corresponding to the motor counter EMF representative of actual motor speed, and a second input connected to receive a variable DC reference signal derived from the DC power source and representative of the desired motor speed, the output of the differential summing means being the difference between the signals applied to the first and second inputs, the differential summing means further comprising a feedback loop having an integrating circuit connected between its output and one of the first and second inputs, second switch means connected to the motor armature and operable when the motor armature is disconnected from the DC power source by the first switch means to connect the first input to the motor armature, duty cycle modulator means operative to control the first switch means connected to the output of the differential summing means, and, if during any sampling interval that the motor armature is connected to the first input, an error signal represented by a difference between the signals applied to the first and second inputs exists, the differential summing means being operative to produce a correction output signal to cause the duty cycle modulator to vary the duty cycle control function of the first switch means and thereby produce the desired motor speed.

2. A speed servo for a motor having an armature as recited in claim 1 wherein the differential summing means output is held constant when the second switch means is operated to disconnect the first input from the motor armature.

3. A speed servo for a motor having an armature as recited in claim 1 further comprising means connected between the DC power source and the first input to cause integration out of the 100 percent duty cycle condition to enable sampling of the motor counter EMF.

4. A speed servo for a motor having an armature as recited in claim 1 further comprising:
   absorption circuit means connected in parallel with the inputs to the motor to absorb the inductive surge of the armature when the armature is deenergized, to optimize magnetic energy discharge time.

5. A speed servo for a motor having an armature as recited in claim 4 wherein the absorption circuit means comprises the series connection of a rectifier diode and a zener diode in bucking configuration.

6. A speed servo for a motor having an armature as recited in claim 1 wherein the second switch means comprises a MOSFET circuit connected to switch off essentially simultaneously with energization of the motor armature.

7. A speed servo for a motor having an armature as recited in claim 1 wherein the first and second switch means comprise solid state circuits.

8. A speed servo for a motor having an armature as recited in claim 6 wherein the differential summing means comprises a differential operational amplifier.

9. A speed servo for a motor having an armature as recited in claim 7 wherein the duty cycle modulator comprises an astable multivibrator circuit.

10. A speed servo for a motor having an armature as recited in claim 9 wherein the second switch means comprises a MOSFET circuit connected to switch off essentially simultaneously with energization of the motor.

11. A speed servo for a motor having an armature as recited in claim 1 further comprising:
   capacitor means connected across the motor inputs having a time constant in conjunction with the motor resistive load sufficient to reduce noise signals resulting from intermittent connection between the motor brushes and commutator.

* * * * *